July 5, 1955 G. S. PFEIFFER 2,712,232
BALANCING APPARATUS
Filed May 10, 1951
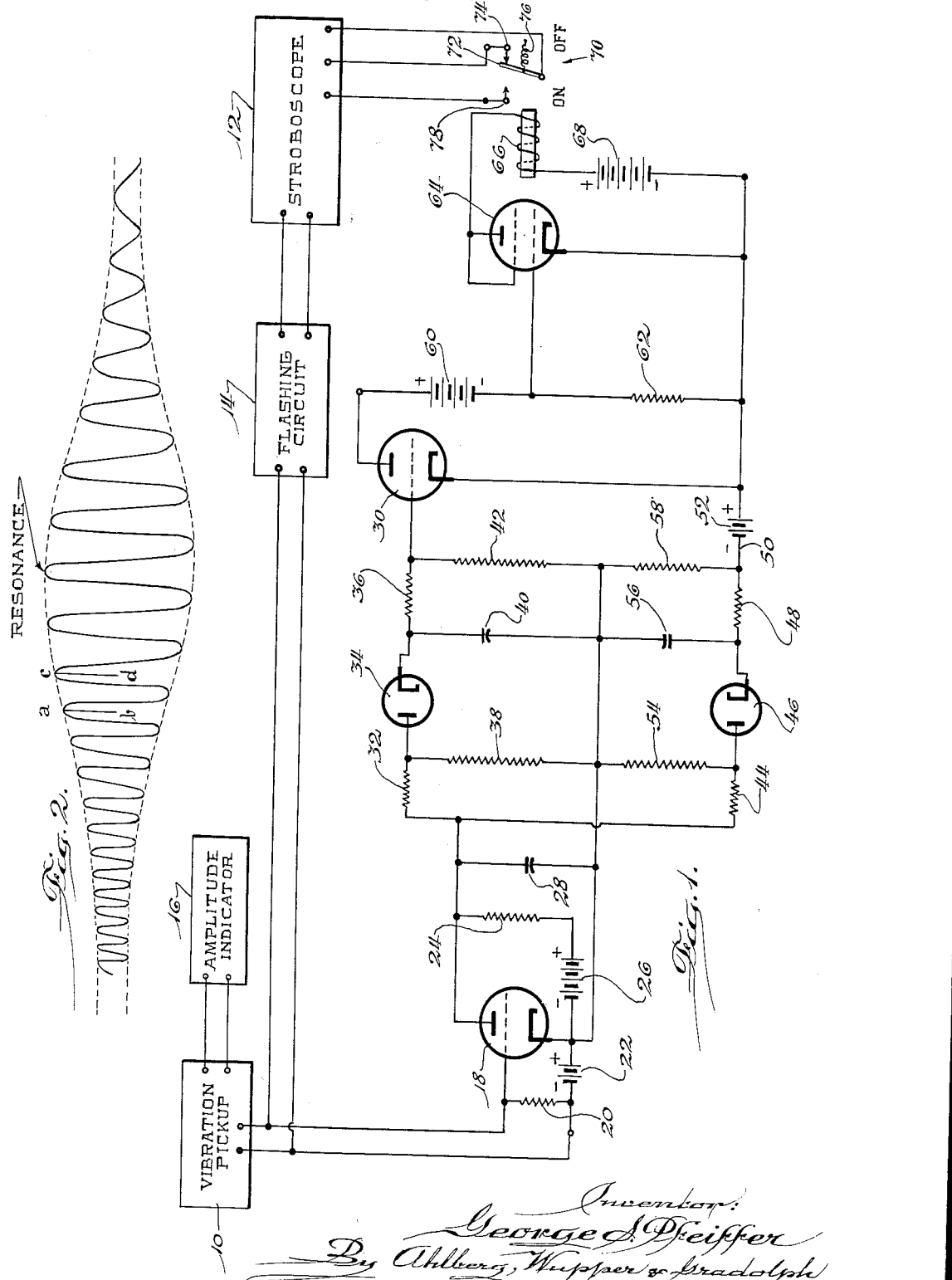
Inventor:
George S. Pfeiffer
By Ahlberg, Wupper & Gradolph
Attorneys.

United States Patent Office 2,712,232
Patented July 5, 1955

2,712,232

BALANCING APPARATUS

George S. Pfeiffer, Chicago, Ill., assignor to Stewart-Warner Corporation, Chicago, Ill., a corporation of Virginia Application May 10, 1951, Serial No. 225,508

7 Claims. (Cl. 73—66)

This invention relates to devices for determining the magnitude and location of unbalanced conditions in a rotatable body. Since the purpose of such devices is to facilitate balancing of bodies, such devices will often be referred to herein as balancing devices. The invention relates particularly to balancing devices which are adapted to measure the relative phasing of the vibration and the rotation of a body at the rotational speed which produces vibratory resonance of the body and its suspension.

Vehicle wheels are usually carried on spring suspensions. Such wheels are often balanced by jacking up the vehicle so that the wheel is clear of its supporting surface, and then setting the wheel into rotation. The wheel is generally rotated by means of a wheel spinner up to a speed considerably above the speed at which vibrational resonance is produced in the system including the wheel and its spring suspension. The spinner is then removed from the wheel so that the speed of the wheel decreases gradually and passes through the vibratory resonant speed. Apparatus is provided to indicate the relative phasing of the vibrations of the wheel and the angular position of the wheel. This indication is a measure of the angular location of unbalanced conditions in the wheel. The phasing of the vibrations with respect to the rotation of the wheel is often measured at vibrational resonance because the relationship between the phasing and the position of the center of unbalance of the wheel is particularly simple at resonance. This is true because at resonance the vibrational displacement of the wheel is substantially 90° late with respect to the unbalanced force which produces the vibrations.

An indicator of vibrational amplitude is usually provided to give an indication that the resonant speed of the wheel has been reached. The vibrations of the wheel and its spring suspension are generally most pronounced at the vibrational resonant speed. Consequently, an amplitude indicator reaches a maximum indication at the resonant speed.

In some situations the speed of the wheel passes downward through the resonant speed rather rapidly. Moreover, the relative phasing of the vibrations and rotation of the wheel sometimes is subject to rapid changes near the resonant speed. Consequently it is sometimes difficult to watch an amplitude indicator and appreciate that resonance has been reached in time to make an accurate reading of the phase indicator.

Accordingly, an object of the invention is to provide a balancing apparatus having a phase indicator to measure the phasing of the vibrations of a rotating body with respect to its rotational position, together with means to produce a noticeable change in the operation of the indicator as the body passes through vibrational resonance.

A further object is to provide a balancing apparatus in which a stroboscope is flashed in synchronism with vibrations of a rotating body, and in which the stroboscope is turned off or on when the body passes through vibrational resonance.

A further object is to provide means to perform a switching operation when a vibrational signal passes through a maximum value, regardless of the absolute magnitude of the signal.

A further object is to provide a balancing apparatus having means which greatly facilitates making readings of vibrational phasing.

Further objects, advantages, and features of the invention will be apparent from the following description of an illustrative embodiment. In the course of the description reference will be made to the drawings, in which Fig. 1 is a diagrammatic illustration of a balancing apparatus constructed in accordance with the invention; and Fig. 2 is a representation of an oscillogram of the vibrations of a freely decelerating body.

The balancing apparatus of Fig. 1 includes a vibration pickup 10 adapted to produce electrical signals corresponding to vibrations of a rotating body such as a vehicle wheel. These parts of the apparatus are well known, and may be of the type shown in the patent to A. C. Allen, No. 2,521,141. The vibration pickup energizes a phase indicator which may be a stroboscope 12. The stroboscope may be coupled to the vibration pickup by means of a flashing circuit 14. The vibration pickup and the flashing circuit cooperate to flash the stroboscope in synchronization with the vibrations of the rotating body. The vibration pickup also energizes an amplitude indicator 16.

An arrangement is also provided to perform a switching operation in the stroboscope circuit in the neighborhood of the resonant speed of the rotating body. The stroboscope switching arrangement includes an amplifying triode 18 having the usual grid resistor 20, grid bias source 22, plate load resistor 24, and plate voltage source 26. A bypass capacitor 28 is connected between the plate and cathode of the amplifying triode 18 to reduce the response of the triode to extraneous high frequency signals.

A pair of control paths are provided to connect the plate and cathode of the triode 18 with the grid and cathode of an amplifying triode 30. The first path includes a resistor 32 connected between the plate of the triode 18 and the plate of a diode rectifier 34. The cathode of the diode is connected to the grid of the tube 30 through a resistor 36. The plate of the diode 34 is connected to the cathode of the tube 18 by a resistor 38. A capacitor 40 is connected between the cathode of the diode 34 and the cathode of the triode 18. A grid resistor 42 is connected between the grid of the triode 30 and the cathode of the triode 18.

The second path includes a resistor 44 connected to the plate of a diode rectifier 46. The cathode of the diode 46 is connected by a resistor 48 to the negative terminal 50 of a grid biasing battery 52. The other terminal of the battery 52 is connected to the cathode of the triode 30. A resistor 54 is connected between the plate of the diode 46 and the cathode of the triode 18. A capacitor 56 is connected between the cathode of the diode 46 and the cathode of the triode 18. A grid resistor 58 is connected between the negative terminal 50 of the biasing battery 52 and the cathode of the tube 18.

A plate supply source 60 and a plate load resistor 62 are connected in series between the plate and the cathode of the triode 30, the source being connected to the plate and the load resistor to the cathode.

The grid and cathode of an amplifying tetrode 64 are connected across the plate load resistor 62, the cathode of the tetrode being connected to the cathode of the triode 30.

The screen grid and the plate of the tetrode 64 are connected together, and a relay winding 66 and a plate supply source 68 are connected in series between the plate and the cathode of the tube 64. The relay winding 66 is a part of an electrical relay 70 which also includes an armature 72 which is biased into engagement with a contact 74 by a spring 76. Energization of the relay winding 66 is effective to move the armature 72 into engagement with a second contact 78. The armature 72 and the contacts 74 and 78 may be connected to the stroboscope 12 in such a manner that the stroboscope is off when the armature 72 contacts the contact 74 and the stroboscope is on when the armature contacts the contact 78. The reverse connections are also suitable. The exact switching arrangement is not illustrated since it depends upon the type of stroboscope circuit which is employed.

In operating the balancing apparatus for balancing a vehicle wheel, the wheel is rotated up to a speed considerably above the speed which produces vibratory resonance, and then the wheel is allowed to decelerate freely. As the wheel passes through its vibratory resonant speed, its vibrations trace an oscillogram similar to Fig. 2. The frequency of the vibrations continuously decrease as the speed of the wheel decreases. The amplitude of the vibrations increases at first until the point marked "resonance" is reached, and then the amplitude decreases. The resonant point is a turning point at which the rate of change of the amplitude is zero.

The arrangement of Fig. 1 is such that in one mode of operation the phase indicator does not operate until resonance is reached. When no vibrations are being picked up by the vibration pickup 10, the relay winding 66 is energized to such a small extent that the relay armature 72 is held against the relay contact 74 by the spring 76. Consequently the stroboscope 12 is turned off. When no vibration signals are applied to the tube 18, the plate voltage source 26 produces equal currents through the rectifiers 34 and 46 and through the grid resistors 42 and 58. The voltage drops across the resistors 42 and 58 are equal because the value of the resistor 32 equals the value of the resistor 44, the value of the resistor 38 equals the value of the resistor 54, the value of the resistor 36 equals the value of the resistor 48, and the value of the resistor 42 equals the value of the resistor 58. Since the resistors 42 and 58 are connected in series opposition, the voltage drops across the resistors 42 and 58 nullify each other and the grid-cathode voltage of the triode 30 is equal to the voltage of the grid bias source 52. The voltage of the grid bias source 52 is relatively low so that the triode 30 draws a substantial plate current to produce a substantial voltage drop across the plate load resistor 62. The voltage drop across the resistor 62 biases the grid of the tube 64 negatively to such an extent that the plate current of the tube 64 is reduced to a point such that the relay armature 72 is released into its off position in engagement with the contact 74.

During the operation of the balancing apparatus vibration signals are applied to the grid of the triode 18. These signals are amplified and impressed upon the plates of the rectifiers 34 and 46. The rectifiers produce direct current control voltages across the resistors 42 and 58. These control voltages tend to counterbalance each other because the resistors 42 and 58 are connected in series opposition.

When the speed of the vehicle wheel is above resonance the amplitude of the vibration signals is increasing. During this period the relay armature 72 remains in its off position. This occurs because the rectifier circuits are arranged so that when the amplitude of the vibration signals is increasing the rectifier 34 produces a greater voltage across the resistor 42 than the rectifier 46 produces across the resistor 58. This results because the time constant of the circuit including the rectifier 34 is considerably less than the time constant of the circuit including the rectifier 46. In order to provide the difference in the time constants the capacitor 40 has a considerably smaller value than the capacitor 56. The respective values may be 0.1 microfarad and 20 microfarads, for example. Thus when the amplitude of the vibration signals is increasing, the capacitor 56 charges more slowly than the capacitor 40 and so the voltage across the resistor 58 rises more slowly than the voltage across the resistor 42. The voltage across the resistor 58 lags behind the voltage across the resistor 42 in responding to changes in amplitude of the vibration signals. For example, the voltage across the resistor 58 may represent an amplitude such as $a$—$b$ in Fig. 2, while the voltage across the resistor 42 represents an amplitude such as $c$—$d$.

It follows that when the amplitude of the vibration signals is increasing, the positively polarized voltage across the resistor 42 is greater than the negatively polarized voltage across the resistor 58, and the plate current in the triode 30 is greater than for zero signal conditions. The increased voltage drop across the plate load resistor 62 decreases the current in the relay tube 64 still further than before, so that the relay armature 72 remains in its released position. It will be recalled that the zero signal current in the plate circuit of the tube 64 is insufficient to pull in the relay armature 72.

When resonance is reached the vibrational amplitude variation flattens out and the voltage across the resistor 58 catches up with the voltage across the resistor 42 so that the two voltages are practically equal.

As soon as the vibrational amplitude begins to decrease, the voltage across the resistor 42 becomes less than the voltage across the resistor 58. The plate current in the tube 30 becomes less than its zero signal value and the voltage drop across the resistor 62 is correspondingly reduced. The resultant increase in the plate current in the relay tube 64 energizes the relay coil 66 to such an extent that the relay armature 72 is attracted. This turns on the phase indicating stroboscope so that a phase reading can be made.

It is also possible to connect the relay contacts 74 and 78 to the stroboscope in such a way that the pulling in of the relay armature 72 turns the stroboscope off. The phase reading is then taken as the last reading just before the stroboscope is turned off.

In the above described mode of operation, the relay armature 72 is pulled in as the vibrating body passes through its resonant speed. With a slight modification the balancing apparatus operates so that the relay is released as the rotating body passes through its resonant speed. In this modification the voltage of the grid bias source 52 is greater than in the first described arrangement so that the zero signal plate current in the tube 30 is small, and the voltage drop across the plate load resistor 62 is correspondingly small. The resulting plate current in the relay tube 64 is relatively great so that the relay armature 72 is pulled in when no vibration signals are being supplied by the vibration pickup 10. When vibration signals having progressively increasing amplitude are applied to the grid of the tube 18, the positively polarized voltage across the resistor 42 exceeds the negatively polarized voltage across the resistor 58. The consequent increase in the plate current of the triode 30 decreases the plate current in the relay tube 64 to such an extent that the relay armature 72 is released. When resonance is reached the voltages across the resistors 42 and 58 become substantially equal, the plate current in the tube 30 decreases, and the relay armature 72 is again pulled in. As the amplitude of the vibration signal decreases, the voltage across the resistor 58 becomes greater than the voltage across the resistor 42. The resulting low plate current in the triode 30 produces a high current in the relay tube 64 so that the relay is held in its pulled in position.

As pointed out previously, the relay contacts may be arranged so that the stroboscope is either turned on or turned off when the relay is pulled in. The switching operation in the stroboscope circuit provides an indication of the resonant point at which the phase reading is to be taken. The switching operation is carried out by electrically operable switching means including the relay and the amplifying electron tubes 39 and 64. The signals from the two control paths oppose each other, one signal tending to operate the switching means and the other signal tending to restrain the operation thereof. Because of the difference in the time delays provided by the two paths, the switching operation is performed as the vibrational signal passes through a maximum value, regardless of the absolute magnitude of the signal.

Many of the details of the embodiment described above are merely illustrative and should not be taken as limitative. The invention may be practiced in many equivalent ways. The general scope of the invention is indicated by the following claims.

I claim:

1. In an apparatus for balancing a rotating body, a vibration pickup and flashing circuit to provide signal pulses in response to the vibrations of the body, a stroboscope coupled to the flashing circuit to illuminate the rotating body in synchronization with the signals from the vibration pickup in order to determine the phase of the vibrations in relation to the rotary position of the body, a circuit including switching means connected to the stroboscope to produce a noticeable change in the operation of the stroboscope, a control circuit connected between the pickup and the switching means to operate the switching means when the signal from the pickup passes through a maximum value, the control circuit including first and second signal paths, means connecting the outputs of the paths in opposition, rectifiers in the respective paths, components in the first path providing a relatively short time delay, and components in the second path providing a relatively long time delay.

2. In an apparatus to perform a switching operation when a freely decelerating rotating body passes through vibrational resonance, a vibration pickup to provide signals in response to vibrations of the body, switching means to perform the switching operation, a first signal path connecting the pickup with the switching means to operate the latter, a second signal path connecting the pickup with the switching means to restrain operation thereof, rectifiers in the respective paths, components in the first path providing a relatively short time delay, and components in the second path providing a relatively long time delay.

3. In apparatus for balancing a body, means responsive to vibration controlled signals for use in determining the phase of the vibrations in relation to the position of the body, switching means connected to said signal responsive means for producing a noticeable change in the operation thereof, a vibration pickup coupled to said signal responsive means to provide vibration signals therefor, and a control circuit connecting the pickup with the switching means to operate the latter when the signals from the pickup pass through a maximum value, the control circuit including a first path having a rectifier and providing a unidirectional control signal for operating the switching means, a second path having a rectifier and providing a unidirectional control signal to restrain operation of the switching means, means in the first path providing a short time lag in the variation of the control signal from the path, and means in the second path providing a considerably longer time lag in the variation of the signal from the second path.

4. In an apparatus to perform a switching operation when the vibrations of a body pass through a maximum value, a vibration pickup to provide electrical signals corresponding to the vibrations, switching means to perform the switching operation, a first control path having an output circuit connected to the switching means and an input circuit connected to the vibration pickup, a rectifier in the first path to provide a unidirectional control signal for operating the switching means in response to signals from the vibration pickup, a second control path having an input circuit connected to the vibration pickup and an output circuit connected in series opposition with the output circuit of the first path, a series impedance in each of said output circuits, a rectifier in the second path to provide unidirectional control signals for restraining the operation of the switching means, and first and second capacitors connected in shunt with the respective output circuits of the first and second paths, one of the capacitors providing substantially greater time delay than the other.

5. In apparatus for determining unbalance in a rotary body, a vibration pickup to provide vibration signals, means connected to the pickup for use in determining the phase of the vibration signals in relation to the rotary position of the body, relay switching means connected to said first mentioned means to produce a noticeable change in the operation of the latter, a first control path having an output circuit connected to the relay switching means and an input circuit connected to the vibration pickup for operating the switching means, a second control path having an input circuit connected to the vibration pickup and an output circuit connected in series opposition with the output circuit of the first path for restraining the operation of the switching means until the vibration signals pass through a maximum value, rectifying means for energizing said first and second paths and series impedances in said respective paths to provide opposed unidirectional control signals in the respective output circuits of the first and second paths, and first and second capacitors connected in shunt with the respective output circuits, one of the capacitors providing substantially greater time delay than the other.

6. Balancing apparatus to indicate the phase relationship in a vibrating system between the vibrations of a body and the position of the body when the frequency of the vibrations passes through a resonant frequency of the system, comprising a vibration pickup to provide vibration signals, means connected to the vibration pickup for use in determining the phase of the vibrations in relation to the position of the body, electrically operable switching means connected to the phase indicator to produce a noticeable change in the operation of the latter, and control means connected between the vibration pickup and the switching means to operate the latter when the vibration signals from the pickup pass through a maximum value.

7. In balancing apparatus, means for determining the phasing of vibrations of a vibrating system in relationship to the position of a moving body when the frequency of the vibrations passes through a resonant frequency of the system, comprising a vibration pickup to provide vibration signals, means connected to the vibration pickup for use in determining the phase of the vibrations in relation to the position of the body, electrically operable switching means connected to said means to produce a noticeable change in the operation of the latter, and control means connected between the vibration pickup and the switching means to operate the latter when the vibration signals from the pickup pass through a maximum value, the control means including a first signal path to provide signals for operating the switching means and a second signal path to provide signals for restraining the operation of the switching means until the vibration signals from the pickup pass through a maximum value.

References Cited in the file of this patent

UNITED STATES PATENTS

| | | |
|---|---|---|
| 2,341,444 | Hunter | Feb. 8, 1944 |
| 2,383,405 | Merrill et al. | Aug. 21, 1945 |
| 2,478,279 | Kochenburger | Aug. 9, 1949 |
| 2,495,627 | Bovey | Jan. 24, 1950 |
| 2,521,141 | Allen | Sept. 5, 1950 |
| 2,577,755 | Hargreaves | Dec. 11, 1951 |